United States Patent
Hills et al.

(10) Patent No.: US 9,558,333 B2
(45) Date of Patent: Jan. 31, 2017

(54) SYSTEMS AND METHODS FOR FACILITATING THE SHARING OF DIGITAL BUNDLES OF SERVICES BETWEEN USERS

(71) Applicant: AOL Inc., Dulles, VA (US)

(72) Inventors: Benjamin G. Hills, Fairfax, VA (US); Umesh S. Chhatre, Ashburn, VA (US); George F. Fletcher, Round Hill, VA (US); Joyce R. Cruickshank, Broadlands, VA (US)

(73) Assignee: AOL INC., Dulles, VA (US)

(*) Notice: Subject to any disclaimer, the term of this patent is extended or adjusted under 35 U.S.C. 154(b) by 478 days.

(21) Appl. No.: 13/887,255

(22) Filed: May 3, 2013

(65) Prior Publication Data

US 2014/0123314 A1  May 1, 2014

Related U.S. Application Data

(60) Provisional application No. 61/719,900, filed on Oct. 29, 2012, provisional application No. 61/798,118, filed on Mar. 15, 2013.

(51) Int. Cl.
 G06F 21/31 (2013.01)
 G06F 21/41 (2013.01)
 G06Q 30/02 (2012.01)

(52) U.S. Cl.
 CPC ............ G06F 21/31 (2013.01); G06F 21/41 (2013.01); G06Q 30/0207 (2013.01)

(58) Field of Classification Search
 CPC .......... G06F 21/31; G06F 21/10; G06F 21/41; G06Q 30/0207

(Continued)

(56) References Cited

U.S. PATENT DOCUMENTS 6,360,254 B1  3/2002  Linden et al.
7,197,125 B1  3/2007  Prasad et al.
(Continued)

FOREIGN PATENT DOCUMENTS

WO   WO 2005/045603   5/2005

OTHER PUBLICATIONS

Mikey Campbell, "*Apple's digital content resale and loan system could allow DRM transfers between end users*," Apple Insider, available at http://appleinsider.com/articles/13/03/07/apples-digital-content-resale-and-loan-system-could-allow-drm-transfers-between-end-users (Mar. 7, 2013 5:00 am) (downloaded May 19, 2013).

(Continued)

*Primary Examiner* — Shanto M Abedin
(74) *Attorney, Agent, or Firm* — Finnegan, Henderson, Farabow, Garrett & Dunner, LLP

(57) ABSTRACT

Systems and methods are disclosed for allowing a primary user to share a digital service, in a bundle of services implemented by a plurality of different service providers, with a secondary user. In accordance with one implementation, a method includes receiving a request from the primary user to share a first service in the bundle of services with the secondary user. The method also includes generating, using at least one processor, a first token that associates the secondary user with the first service. The method further includes sending the first token to one of the plurality of different service providers for the first service. Additionally, the method includes modifying a status of the primary user to restrict access to the first service by the primary user while the first service is being shared with the secondary user.

14 Claims, 17 Drawing Sheets

(58) Field of Classification Search
USPC ..... 726/1–7, 26–30; 705/14.1, 14.22, 14.25; 709/204–206
See application file for complete search history.

(56) References Cited

U.S. PATENT DOCUMENTS

| | | | |
|---|---|---|---|
| 7,617,324 B2 | 11/2009 | Jensen et al. | |
| 7,895,445 B1 | 2/2011 | Albanese et al. | |
| 8,364,595 B1 | 1/2013 | Ringewald | |
| 8,453,209 B2 | 5/2013 | Cen et al. | |
| 8,826,390 B1* | 9/2014 | Varda ............................... | 726/4 |
| 2002/0156905 A1 | 10/2002 | Weissman | |
| 2002/0188503 A1 | 12/2002 | Banerjee et al. | |
| 2004/0153451 A1 | 8/2004 | Phillips et al. | |
| 2004/0235456 A1 | 11/2004 | Liao et al. | |
| 2005/0171819 A1* | 8/2005 | Keaton et al. ..................... | 705/4 |
| 2006/0282386 A1 | 12/2006 | Szeto et al. | |
| 2007/0168874 A1* | 7/2007 | Kloeffer et al. ............. | 715/764 |
| 2007/0226785 A1* | 9/2007 | Chow et al. ...................... | 726/8 |
| 2007/0256124 A1 | 11/2007 | Ih et al. | |
| 2008/0147799 A1 | 6/2008 | Morris | |
| 2008/0162712 A1 | 7/2008 | Fu et al. | |
| 2008/0262920 A1 | 10/2008 | O'Neill et al. | |
| 2008/0319857 A1 | 12/2008 | Dobbins et al. | |
| 2010/0281522 A1 | 11/2010 | Hatakeyama | |
| 2010/0299762 A1 | 11/2010 | Jouret et al. | |
| 2011/0010235 A1 | 1/2011 | Kenny | |
| 2011/0016182 A1* | 1/2011 | Harris .......................... | 709/206 |
| 2011/0022453 A1* | 1/2011 | Dutta ......................... | 705/14.25 |
| 2011/0072496 A1* | 3/2011 | Bertin et al. ...................... | 726/4 |
| 2012/0130850 A1 | 5/2012 | Suzuki | |
| 2012/0239758 A1 | 9/2012 | Dzmitrenka et al. | |
| 2012/0245994 A1 | 9/2012 | Lovelace et al. | |
| 2012/0254303 A1* | 10/2012 | Anbalagan et al. .......... | 709/204 |
| 2012/0291140 A1* | 11/2012 | Robert et al. ................... | 726/28 |
| 2012/0303490 A1* | 11/2012 | Hill et al. ..................... | 705/27.2 |
| 2013/0060615 A1 | 3/2013 | Block et al. | |
| 2013/0060616 A1 | 3/2013 | Block et al. | |
| 2013/0060661 A1 | 3/2013 | Block et al. | |
| 2013/0080223 A1 | 3/2013 | Lavu et al. | |
| 2013/0150000 A1 | 6/2013 | Wong | |
| 2013/0191227 A1* | 7/2013 | Pasa .................. | G06Q 20/3674 705/14.73 |
| 2013/0297504 A1* | 11/2013 | Nwokolo ............. | G06Q 20/363 705/41 |
| 2013/0332839 A1 | 12/2013 | Frazier et al. | |
| 2014/0122204 A1 | 5/2014 | Hills et al. | |
| 2014/0122217 A1 | 5/2014 | Hills et al. | |
| 2014/0189834 A1* | 7/2014 | Metke et al. ..................... | 726/7 |

OTHER PUBLICATIONS

Akkermans, H., Baida, Z., Gordijn, J., Pena, N., Atluna, A., and Laaresgolti, I., "Value Webs: Using Ontologies to Bundle Real-World Services," Jul./Aug. 2004, retrieved on Oct. 11, 2014, from www.ualberta.ca/~reformat/ece720w2012/papers/IEEXplore-22.pdf.

Cricket Magazine, "Transfer Magazine Subscriptions" archived by Internet Wayback Machine on Feb. 4, 2012 and located at https://www.cricketmag.com/form/index.asp?nFormID=35.

International Search Report and Written Opinion of the International Searching Authority for International Application No. PCT/US2013/40334 mailed Dec. 4, 2014, 14 pages.

* cited by examiner

SYSTEMS AND METHODS FOR FACILITATING THE SHARING OF DIGITAL BUNDLES OF SERVICES BETWEEN USERS

REFERENCE TO RELATED APPLICATION(S)

This application claims the benefit of priority to U.S. Provisional Application No. 61/719,900, filed Oct. 29, 2012, and U.S. Provisional Application No. 61/298,118, filed Mar. 15, 2013, which are both expressly incorporated herein by reference in their entirety.

BACKGROUND

Technical Field

The present disclosure relates generally to digital services and computerized systems and methods for aggregating and sharing digital services in bundles. More particularly, and without limitation, the present disclosure relates to systems and methods for presenting, storing, bundling, sharing, and managing purchases of digital services and/or other items (e.g., coupons, subscriptions, redeemable credits, and exclusive discounts, etc.).

Background

Various solutions exist for presenting advertisements, sales information, and products and services to customers. However, customers are frequently presented with broad presentations and usually do not have the freedom to receive or create offers that are tailored to them. Another drawback of existing solutions is that they require customers or online users to manage and purchase services and/or other items individually or according to predetermined packages. Moreover, users are required to purchase services from each individual service provider (i.e., Netflix™, Pandora One™, Norton™, etc.), using individual user accounts for each service, and according to predetermined pricing structures.

There are also other drawbacks. For example, existing service providers, including those that provide online services and other digital services, do not allow end-users to customize packages of services or to buy items in bundles. Furthermore, existing service providers do not provide users the ability to customize and share services for creating a unique and tailored experience for users and their friends.

In addition, some premier marketers use behavior and search patterns to present targeted advertising and sales information to users. However, as Do Not Track ("DNT") and other privacy measures become more prominent, the ability of entities to purchase the information used to identify these patterns will significantly diminish.

In view of the foregoing, there is a need for improved systems and methods for providing digital services to customers. There also exists a need for improved systems and methods for presenting, storing, bundling, sharing, and managing purchases of digital services and/or other items. A need also exists for solutions that enable customers and other users the ease, convenience, and access of purchasing and/or sharing multiple services from different service providers, with the simplified billing and the cost-savings of bundled purchasing.

SUMMARY

Consistent with the present disclosure, systems and methods are provided for aggregating and sharing digital services in bundles. Embodiments of the present disclosure encompass improved systems and methods for providing digital services to customers, including online and mobile users of digital services. In addition, embodiments of the present disclosure provide systems and methods for presenting, storing, bundling, sharing, and managing purchases of digital services and/or other items (e.g., coupons, subscriptions, redeemable credits, and exclusive discounts, etc.).

In accordance with additional embodiments of the present disclosure, a system is provided for allowing a primary user to share a digital service in a bundle of services with a secondary user. The system may comprise at least one processor and a memory device storing instructions which, when executed by the at least one processor, causes the processor to receive a request from the primary user to share a first service in the bundle of services with the secondary user, the bundle of services being implemented by a plurality of different service providers. A first token may be generated that associates the secondary user with the first service to be shared. The first token may be sent to one of the plurality of different service providers to enable access to the first service by the secondary user.

In accordance with certain embodiments, a computerized method is provided for allowing a primary user to share a digital service in a bundle of services with a secondary user. The method may receiving a request from the primary user to share a first service in the bundle of services with the secondary user, the bundle of services being implemented by a plurality of different service providers. The method may also generate, by at least one processor, a first token that associates the secondary user with the first service to be shared. The method may further send, by the at least one processor, the first token to one of the plurality of different service providers to enable access to the first service by the secondary user.

It is to be understood that both the foregoing general description and the following detailed description are exemplary and explanatory only, and are not restrictive of embodiments consistent with the present disclosure. Further, the accompanying drawings, which are incorporated in and constitute a part of this specification, illustrate embodiments of the present disclosure and together with the description, serve to explain principles of the present disclosure.

BRIEF DESCRIPTION OF THE DRAWINGS

The accompanying drawings, which are incorporated in and constitute a part of this disclosure, illustrate several embodiments and aspects of the present disclosure, and together with the description, serve to explain the principles of the presently disclosed embodiments. In the drawings.

DETAILED DESCRIPTION OF THE EMBODIMENTS

Reference will now be made in detail to exemplary embodiments, examples of which are illustrated in the accompanying drawings. Wherever possible, the same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Figure 1:
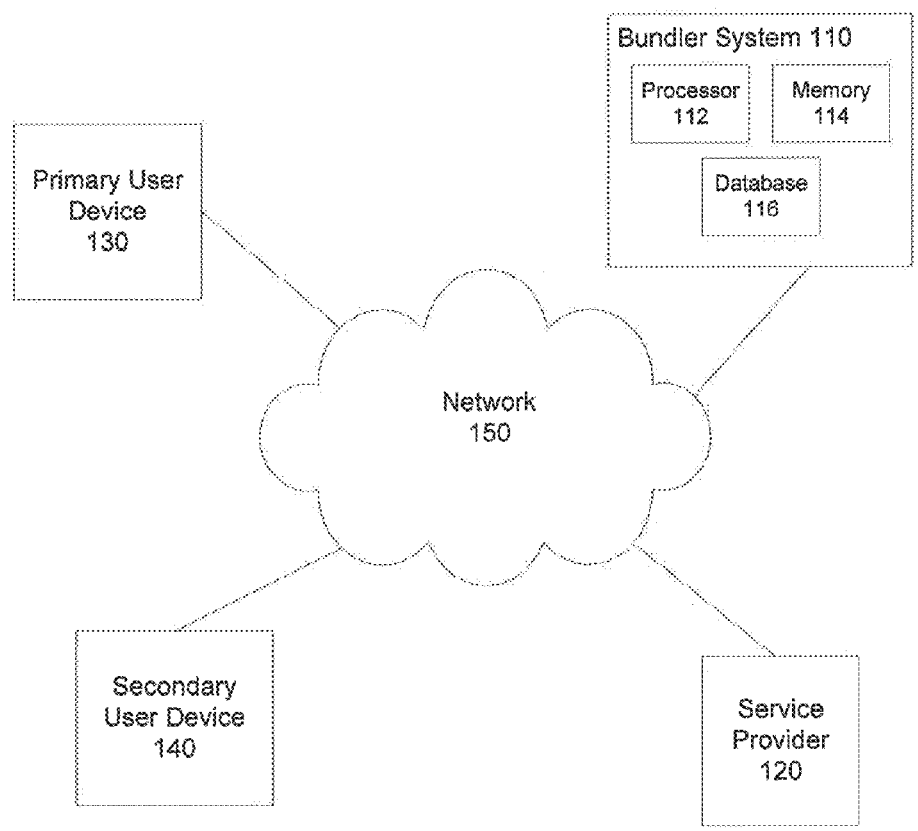
FIG. 1 depicts a block diagram of an exemplary system environment in which embodiments consistent with the present disclosure may be practiced and implemented.

FIG. 1 illustrates an exemplary system environment 100 in which embodiments consistent with the present disclosure may be practiced and implemented. As further disclosed herein, environment 100 of FIG. 1 may be used for bundling digital services and providing those services to customers or users, including online and mobile end-users. The bundles of services may be prepackaged or customized based on a user's configuration or selection of services. As will be appreciated, the number and arrangement of components illustrated in FIG. 1 is for purposes of illustration. Other arrangements and combinations of components may be utilized for implementing the embodiments and features disclosed herein.

As shown in FIG. 1, system environment 100 may include one or more bundler systems 110, service providers 120, primary user devices 130, and secondary user devices 140. All of these components of system environment 100 may be disposed for communication with one another via an electronic network 150, which may comprise any form or combination for supporting digital data communication. Examples of electronic network 150 include a local area network (LAN), a wireless LAN (e.g., a "WiFi" network), a wireless Metropolitan Area Network (MAN) that connects multiple wireless LANs, a wide area network (WAN) (e.g., the Internet), and a dial-up connection (e.g., using a V.90 protocol or a V.92 protocol). In the embodiments described herein, the Internet may include any publicly-accessible network or networks interconnected via one or more communication protocols, including, but not limited to, hypertext transfer protocol (HTTP) and transmission control protocol/internet protocol (TCP/IP). Moreover, electronic network 150 may also include one or more mobile device networks, such as a GSM network or a PCS network, that allow mobile devices, such as a primary or secondary user device, to send and receive data via applicable communications protocols, including those described above.

Figure 4:
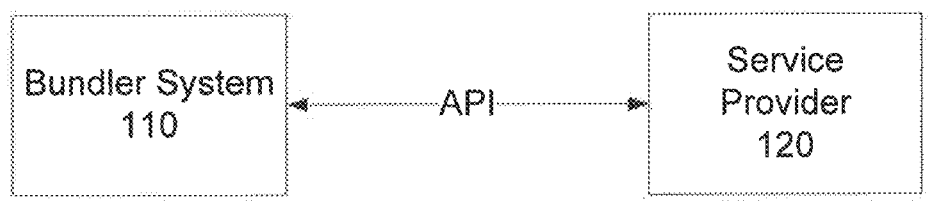
FIG. 4 depicts a block diagram of an exemplary system for allowing service providers to make their digital services available for bundling, consistent with embodiments of the present disclosure.

As will be described in more detail below, in certain embodiments, bundler system 110 may be configured to send and receive application programming interface (API) requests to and from service providers 120 for providing digital services for bundling. Bundler system 110 may enable service providers 120 to write to an application programming interface (API) and/or test integration in a sandbox. Such an API may comprise a source code interface provided by a computer system or library in order to support requests from a software application. Further, the API may be specified in terms of a programming language that can be interpretative or compiled when an application is built, rather than an explicit low-level description of how data is laid out in memory. The software that provides the functionality described by an API is said to be an implementation of the API. Bundler system 110 may allow service provider 120 to write to an API to have its service made available for bundling. FIG. 4 illustrates an exemplary diagram for the exchange of API requests and responses between bundler system 110 and service providers 120, according to embodiments of the present disclosure.

Bundler system 110 may also be configured to accept requests from users for a digital bundle of services and provide the bundle to the user via, for example, an online dashboard. The online dashboard may include any portal or webpage for displaying a graphical user interface to user on primary user device 130 or secondary user device 140. For example, bundler system 110 may receive a request from primary user device 130 for purchasing and accessing a particular bundle of digital services. Such services may include digital subscriptions, redeemable credits, and/or exclusive discounts (referred to herein as "digital services" or simply "services"). These services may include, but are not limited to, data, news, music, photos, video, search, security, shopping, social networking, travel, and other such services, such as Netflix™, Pandora One™, Norton™, Consumer Reports™, Redbox™, LivingSocial™, iTunes™, ADT™, and Overstock.com™. As further described herein, digital subscriptions refer to services that provide monthly access to digital content (e.g., music, videos, etc.) in the form of a subscription, such as Netflix™ or Pandora One™. Redeemable credits (or "coupons") refer to a credit for an amount of money that may be redeemed for products and/or services, either online or in-store (e.g., $10 to use on LivingSocial™; $20 to use in stores at Best Buy; etc.). Redeemable credits may be consumed on a transaction-by-transaction basis without a subscription. In certain embodiments, redeemable credits may be issued in configurable numbers per day, month, or year. Exclusive discounts refer to a credit for a certain discount that may be redeemed for products and/or services, either online or in-store (e.g., 10% off at Overstock.com™; 5% off in stores at Best Buy; etc.). Other information, products, or services may be offered and provided in a bundle, such as bonus products or services.

Bundler system 110 may send a request to service provider 120, indicating a user's request to activate (or access when pre-activated) the particular service(s) provided by service provider 120 (e.g., iTunes™ provided by Apple, Inc.). Service provider 120 may acknowledge the request and send a response back to bundler system 110 using, for example, predetermined handshake protocols. As a result of receiving the response, bundler system 110 may render a landing page (e.g., webpage) for primary user device 130 to access the service. In other embodiments, handshake protocol(s) need not be executed for bundler system 110 to render the landing page. In such embodiments, bundler system 110 may send a request to service provider 120, and render the landing page, without waiting for service provider 120 to send an acknowledgment or response.

Figure 2:
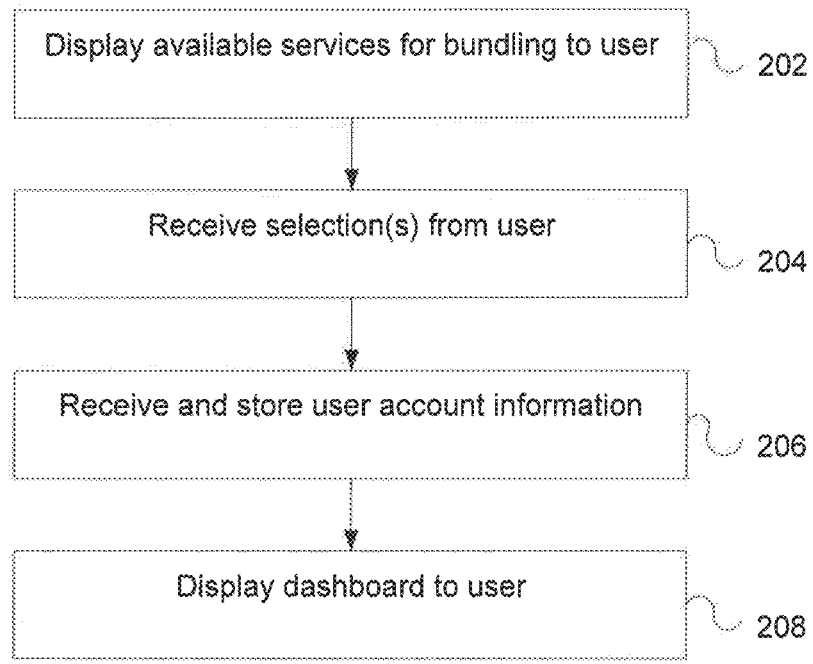
FIG. 2 depicts a flowchart of an exemplary method for providing digital services to users, consistent with embodiments of the present disclosure.

FIG. 2 depicts a flowchart of an exemplary method 200, consistent with embodiments of the present disclosure, for allowing users to bundle services using, for example, bundler system 110 of FIG. 1. As illustrated in FIG. 2, method 200 may include displaying available services for bundling to a user on primary user device 130 (step 202). Primary user device 130 may include one or more of a tablet device, mobile phone, smart-phone, computer, laptop, personal digital assistant, television, or any other device that a user may use to purchase and access services. In one embodiment, bundler system 110 may display available services in a web browser on a host website of bundler system 110 (e.g., www.gathr.com). In another embodiment, bundler system 110 may display available services in a mobile application on primary user device 130. Bundler system 110 may display a graphical user interface, allowing the user to select and purchase prepackaged bundles or customized bundles of digital services and/or other items. In one embodiment, bundler system 110 may allow the user to purchase and/or have access to more than one bundle, including a combination of prepackaged bundles and/or customized bundles.

Figure 11:
FIG. 11 depicts a screenshot of an exemplary interface for receiving selections(s) from a user for a prepackaged bundle of services, consistent with embodiments of the present disclosure.
Figure 12:
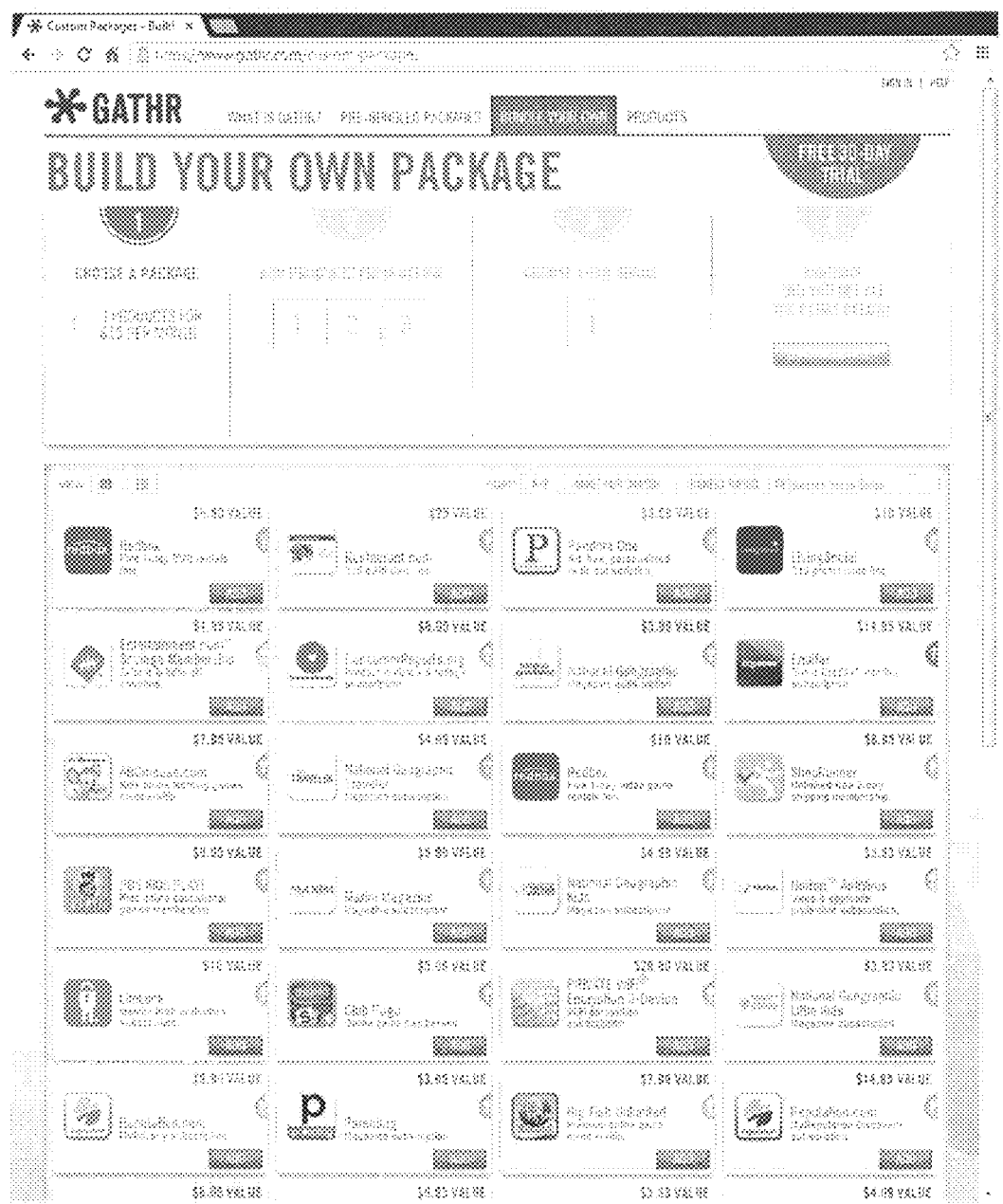
FIG. 12 depicts a screenshot of an exemplary interface for receiving selections(s) from a user for a customized bundle of services, consistent with embodiments of the present disclosure.

In step 204, bundler system 110 may receive from a user, via primary user device 130, selection(s) for a bundle (either prepackaged or customized). For example, bundler system 110 may allow a user to choose a prepackaged bundle including 4 digital subscriptions, 1 redeemable credit, and 2 exclusive discounts. In another example, a user may create a custom bundle, by choosing for instance 2 digital subscriptions not offered in the prepackaged bundle, 2 redeemable credits, and 2 different exclusive discounts not offered in the prepackaged bundle. In one embodiment, the graphical user interface provided by bundler system 110 offers a configurable number of services or products from one or more categories. For example, a user may select 1 service or product from the service subscriptions, 1 service or product from the redeemable coupons, and 1 service or product from the exclusive discounts. FIG. 11 illustrates an exemplary interface for receiving selections(s) from a user for a prepackaged bundle of services. FIG. 12 illustrates an exemplary interface for receiving selections(s) from a user for a customized bundle of services.

Returning to FIG. 2, in step 206, bundler system 110 may receive and store user account information. For example, bundler system 110 may request that the user enter a username, password, payment information, email address, mailing address, phone number, etc. Bundler system 110 may store this information to create a user account. The user account may allow the user to login and access the services facilitated by bundler system 110. Bundler system 110 may charge the user a price for the bundle of services (e.g., $15/month for the bundle).

Figure 10:
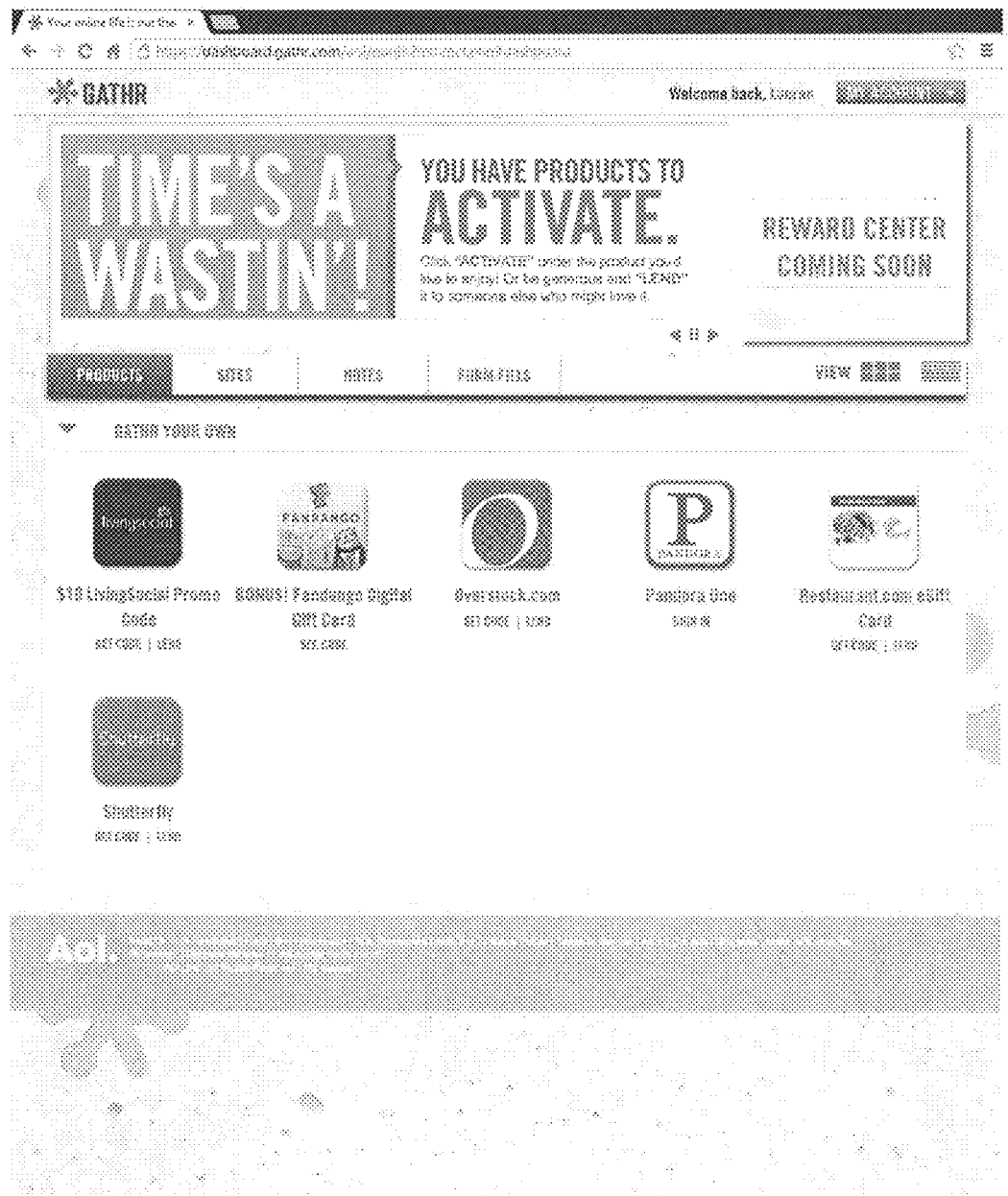
FIG. 10 depicts a screenshot of an exemplary dashboard for providing digital services in bundles, consistent with embodiments of the present disclosure.

In step 208, bundler system 110 may display the user's bundled services on primary user device 130 of the user. For example, bundler system 110 may generate a graphical user interface, such as a dashboard, for displaying the user's bundled services. FIG. 10 displays an exemplary screenshot of a dashboard displaying the user's selected services, as further described herein. The dashboard may be displayed in a web browser (as depicted in FIG. 10) or on a mobile application (not shown).

Figure 3:
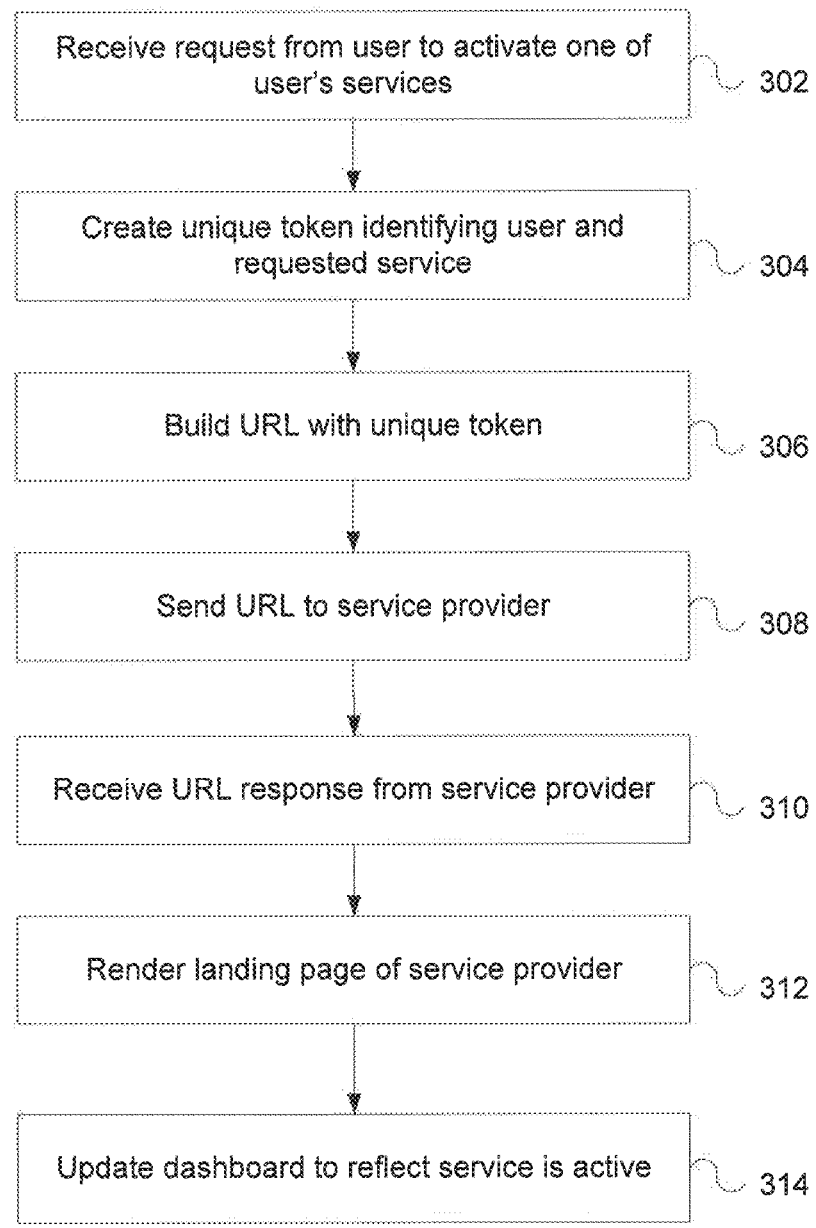
FIG. 3 depicts a flowchart of an exemplary method for activating services in a digital bundle, consistent with embodiments of the present disclosure.

FIG. 3 depicts a flowchart of an exemplary method 300, consistent with embodiments of the present disclosure, for allowing users to activate services using, for example, bundler system 110 of FIG. 1. Method 300 may include receiving a request from a user, via primary user device 130, to activate one of user's bundled services (e.g., pre-selected or pre-purchased) (step 302). For example, after user selects a subscription to Netflix™, bundler system 110 will allow user to activate the subscription. In one embodiment, bundler system 110 may prompt the user to identify whether he/she is a new or current customer of service provider 120. Bundler system 110 may track this information, according to embodiments disclosed herein, to improve the user's experience. If the user is a new customer, in one embodiment, bundler system 110 may then request information from the user to create a user account, such as a new username, password, etc. In another embodiment, bundler system 110 may redirect the user to service provider 120's webpage to create an account, using an embedded token within the URL string. Such a token may allow the user to be redirected to bundler system 110's webpage to complete the activation process. If the user is a current customer, bundler system 110 may allow the user to upgrade or add to his/her existing account with the premier service. For example, if the user is a current customer of Pandora™, bundler system 110 may allow the user to upgrade to the premier Pandora One™ service. In one embodiment, bundler system 110 may redirect the user to service provider 120's webpage to complete the upgrade. The token may be passed and used in the URL string throughout this transaction to identify the user and his service.

Method 300 may also include receiving a request from a user, via primary user device 130, to access one of user's bundled services (e.g., pre-selected or pre-purchased) (step 302). For example, bundler system 110 may provide a hyperlink to allow user to "Sign In" to access his/her subscription to, for example, Netflix™.

In one embodiment, bundler system 110 may provide a password manager plug-in (not shown) to allow the user to enter one username and password for his/her multiple services. Conventional password manager plug-ins and/or similar technology may be used for this purpose.

Referring again to FIG. 3, in step 304, bundler system 110 may create a unique token used to provide a user access to one or more services. For example, bundler system 110 may generate a token to uniquely identify a subscription within a package or bundle of services. Thus, when a user purchases a bundle with, for example, 10 services, bundler system 110 may generate 10 unique tokens to identify each of these 10 subscriptions. In another embodiment, a token may identify a set of services. Each token may also include or identify other information (e.g., user credentials, status and/or duration of a subscription, usage and/or billing details, etc.). In one embodiment, bundler system 110 may create the unique token for each subscription before the user requests to activate the service (e.g., after the user selects a pre-packaged or customized bundle of services).

As further shown in FIG. 3, in step 306, bundler system 110 may build a URL that includes or embeds a unique token within the URL string. Bundler system 110 may send the URL string with the embedded token to service provider 120. The token in the URL string may be used between bundler system 110 and service provider 120 (e.g., Equifax™, LivingSocial™, Netflix™, etc.) for providing the user access to the specific service for which the token was created. Thus, in certain embodiments, the token may act as a communication tool between bundler system 110 and service provider 120 for identifying and tracking the user and his/her use or access of the particular service(s) provided by service provider 120. The token may consist of a randomly generated string of numbers and/or characters. In one implementation, the token may comprise a multi-part token, where each part represents coded information, such as identification of the user, service provider, digital service, length of service, restrictions on service, expiration of service, status of service (e.g., activated, not activated, shared, reclaimed, etc.), associated users with service (e.g., lendors, lendees, etc.), etc.

In step 310, bundler system 110 may receive an URL response from service provider 120, which may acknowledge the request based on the token. In other embodiments, tokens may be passed between bundler system 110 and service provider 120 to pass other information, including user credentials, status and/or duration of a subscription, usage of a subscription, billing details, etc. Bundler system 110 and service provider 120 may communicate with each other via an API, using the tokens.

In step 312, bundler system 110 may determine (through, e.g., handshaking protocols) that a valid response has been received from service provider 120. Once the handshake has been completed, bundler system 110 can render the landing page of service provider 120 for display to user on primary user device 130. For example, bundler system 110 can render the webpage of www.netflix.com in user's browser window on primary user device 130. In one embodiment, bundler system 110 need not receive a response from service provider 120. In this embodiment, bundler system 110 may send a request to service provider 120, and render the landing page, without waiting for service provider 120 to send an acknowledgment or response.

Figure 13:
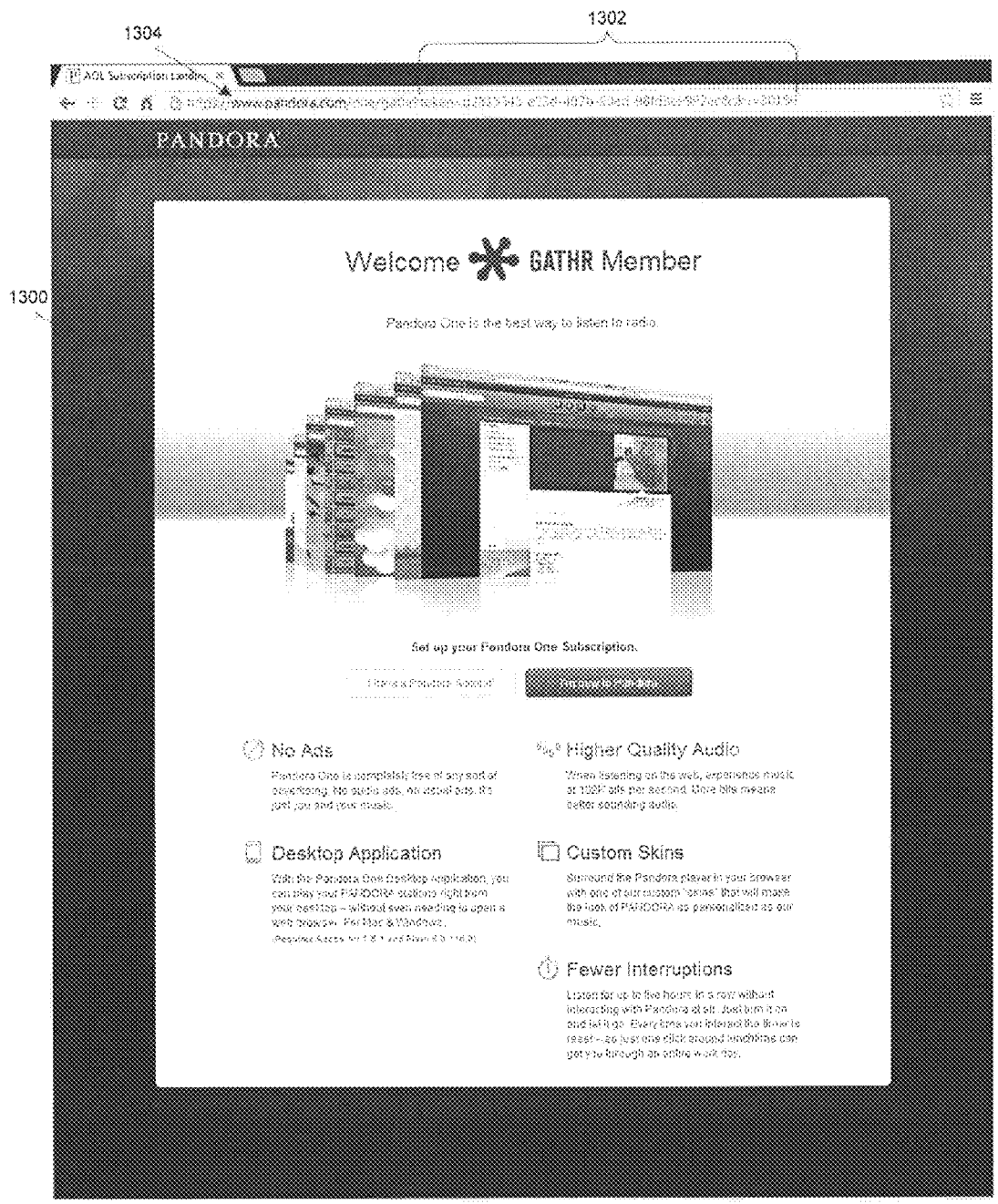
FIG. 13 depicts a screenshot of an exemplary landing page rendered for accessing a digital service, consistent with embodiments of the present disclosure.

The token embedded in the URL string may indicate to service provider 120 to provide its digital content to user. The token may serve to manage account information, including the identity of the purchaser, the service purchased, the terms of the purchase, the duration of the service, etc. The token, therefore, may serve as a unique identifier of the user and service per bundle. FIG. 13 illustrates an exemplary landing page 1300 rendered by bundler system 110 using a token 1302 embedded in a URL string 1304, according to the disclosed embodiments.

Returning to FIG. 3, in step 314, bundler system 110 may update the dashboard of the user to reflect the activated service(s). For example, in FIG. 10, the exemplary dashboard reflects that the service for Pandora One™ has been activated (e.g., "Sign In" is displayed versus "Activate").

In one embodiment, bundler system 110 may allow the user to deactivate services. Embodiments consistent with the present disclosure may enable instantaneous activation or deactivation of the service within the bundle.

In another embodiment, bundler system 110 may allow the user to switch bundles without cancelling his account with bundler system 110. For example, bundler system 110 may allow the user to exchange the subscription to Pandora One™ with a subscription to Netflix™. Bundler system 110 may notify service providers 120 of Pandora One™ and Netflix™ according to embodiments described herein. In one embodiment, bundler system 110 may create a unique token for providing the user with access to the new service and may send the new service provider 110 the unique token. In another embodiment, bundler system 110 may modify the information associated with the unique token for the old service, including, for example, the status of the user's access to the old service, and may send the unique token to the service provider 110 of the old service. Bundler system 110 may also allow the user to prorate the price of the bundle after the switch. In one embodiment, bundler system 110 may delay cancelling the portion of the bundle for a predetermined time period (e.g., 2 or 3 days).

Figure 5:
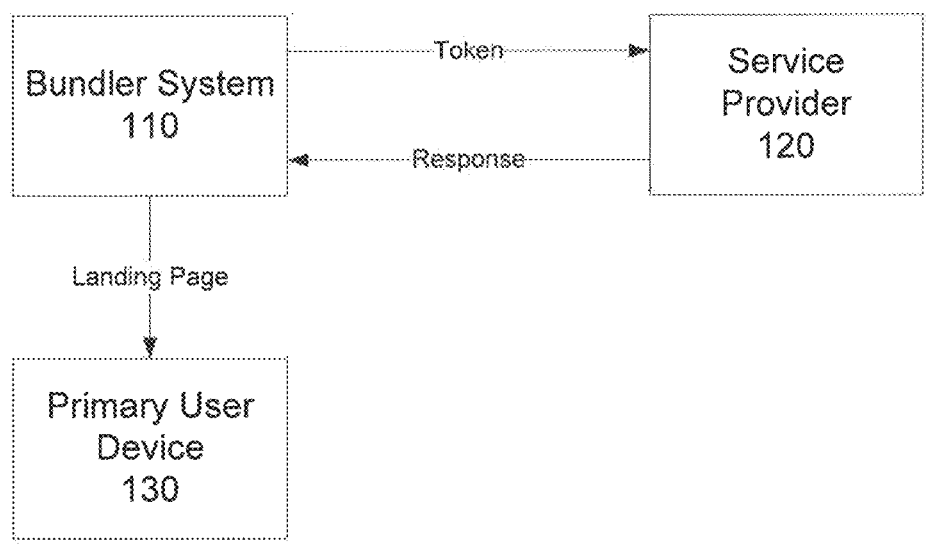
FIG. 5 depicts a block diagram of an exemplary system for notifying service providers of their service being bundled, consistent with embodiments of the present disclosure.

FIG. 5 is an exemplary diagram, consistent with embodiments of the present disclosure, that illustrates the exchange of a token and a response between bundler system 110 and service provider 120. FIG. 5 also shows the rendering of the landing page on primary user device 130. FIG. 5 may be implemented according to the exemplary embodiment of method 300.

Figure 6:
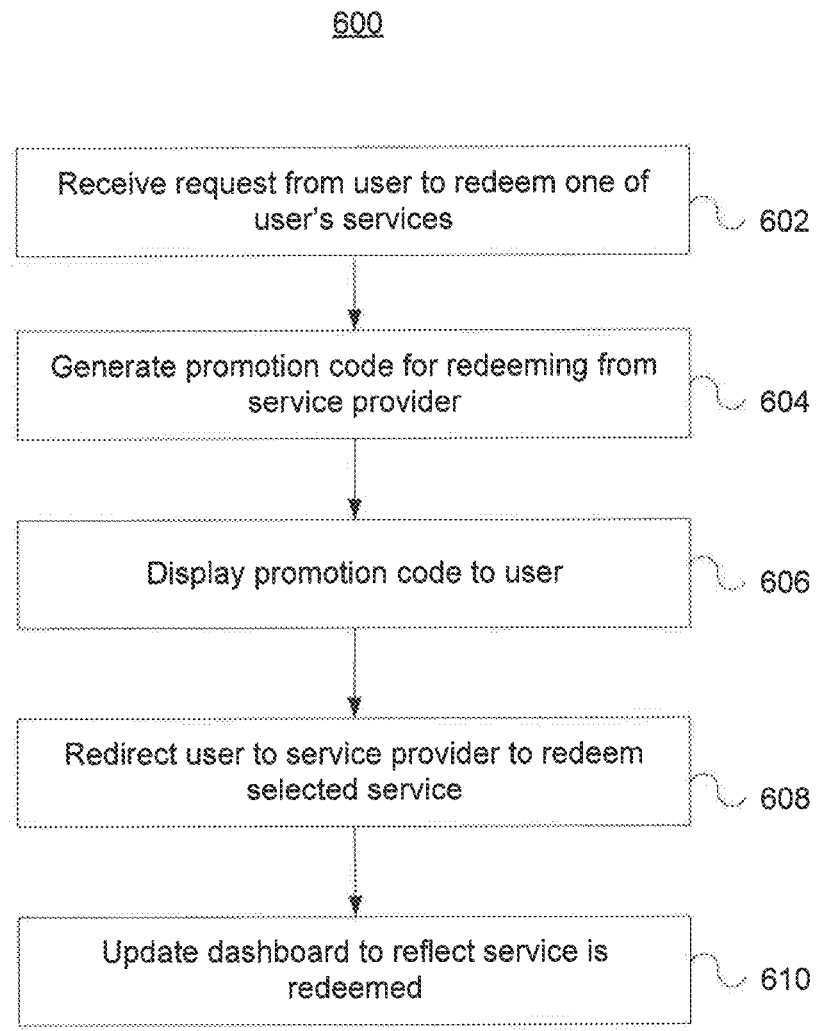
FIG. 6 depicts a flowchart of an exemplary method for redeeming services in a digital bundle, consistent with embodiments of the present disclosure.

FIG. 6 illustrates a flowchart of an exemplary method 600, consistent with embodiments of the present disclosure, for allowing users to use or redeem services using, for example, bundler system 110 of FIG. 1. Method 600 may include receiving a request from a user, via primary user device 130, to use one of user's bundled services (e.g., pre-selected or pre-purchased) (step 602). For example, after user selects a redeemable credit to Fandango™, bundler system 110 may allow user to redeem the credit. In another embodiment, bundler system 110 may allow user to redeem an exclusive discount. In one embodiment, bundler system 110 may prompt the user to identify whether he/she is a new or current customer of service provider 120.

In step 604, bundler system 110 may generate a promotion code for use in redeeming the requested service from service provider 120. The promotion code may be associated with service provider 120 and may be configured to be provided to service provider 120 during a checkout process. In one embodiment, bundler system 110 may generate the promotion code in response to receiving a request from the user. For example, bundler system 110 may provide a clickable button or hyperlink that, when clicked by the user, reveals a promotional code the user can use with service provider 120 to redeem the service (e.g., by the user clicking "Get Code" in FIG. 10). In one embodiment, bundler system 110 may reveal the code to the user without requiring the user to request to reveal it (e.g., upon the user's request to redeem it in step 602).

Figure 14:
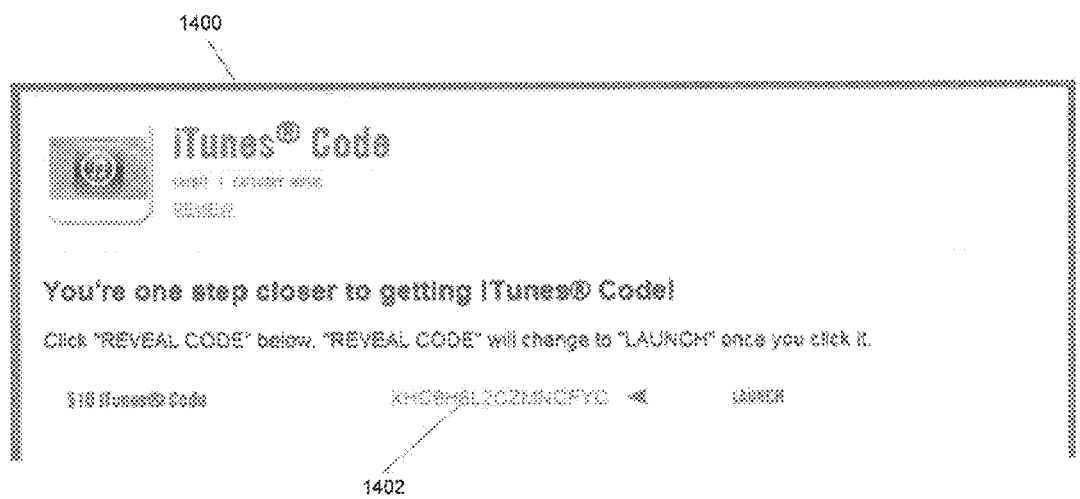
FIG. 14 depicts a screenshot of an exemplary interface for displaying promotion code(s) to a user for a digital service, consistent with embodiments of the present disclosure.

In step 606, bundler system 110 may display the promotion code to the user on primary user device 130. For example, bundler system 110 may display the promotion code in a web browser or in a mobile application of primary user device 130. In one embodiment, bundler system 110 may reveal the promotion code in response to receiving a request from the user (e.g., by the user clicking "Reveal Code"). In one embodiment, bundler system 110 may reveal the code to the user without requiring the user to request to reveal it (e.g., upon the user's request to redeem it in step 602). FIG. 14 illustrates an exemplary interface 1400 rendered by bundler system 110 displaying a promotion code 1402, according to the disclosed embodiments.

In step 608, bundler system 110 may redirect the user to service provider 120's webpage in the user's current web browser of primary user device 130. In another embodiment, bundler system 110 may render a landing page of service provider 120 in the current web browser or mobile application of primary user device 130. In one embodiment, bundler system 110 may receive a request from the user to be redirected to service provider 120's webpage to redeem the selected service (e.g., by the user clicking "Launch" in FIG. 14). The user may then be able to redeem the code by supplying service provider 120 with the code during, for example, an online check-out process.

In another embodiment, bundler system 110 may build a URL with a unique token embedded within the URL string and redirect user to the landing page of service provider 120, in accordance with steps 306-312 of FIG. 3. In this embodiment, the token provided by bundler system 110 may allow the code to be automatically uploaded to the checkout process provided by service provider 120, without the user manually entering the code himself.

In step 608, bundler system 110 may update the dashboard of the user to reflect that the service has been redeemed. For example, in FIG. 10, the dashboard reflects that the service for LivingSocial™ Promo Code has not been redeemed, and the service for Fandango™ has been redeemed (e.g., it has already been revealed and/or used or it can no longer be lent).

Figure 7:
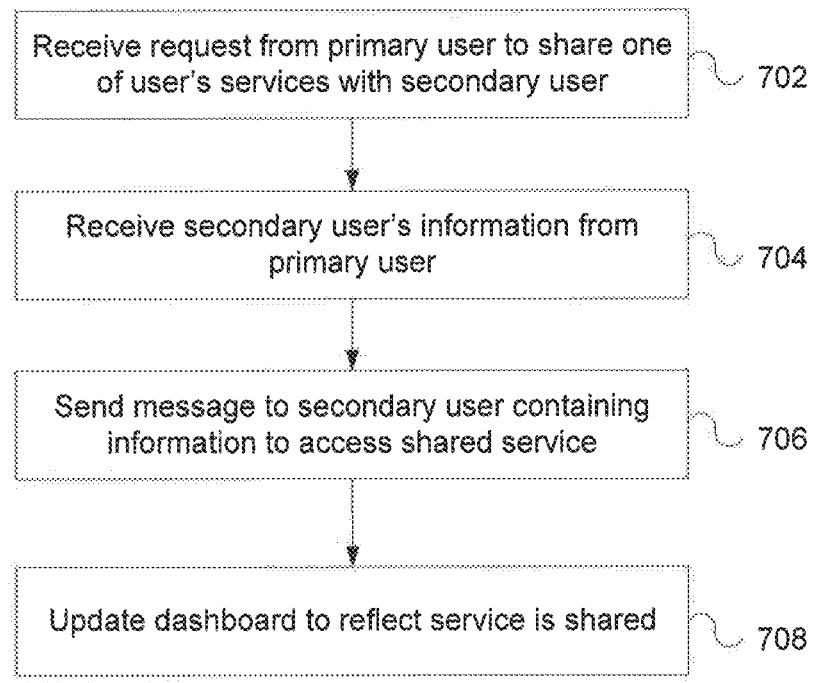
FIG. 7 depicts a flowchart of an exemplary method for sharing services in a digital bundle, consistent with embodiments of the present disclosure.

FIG. 7 illustrates a flowchart of an exemplary method 700, consistent with certain embodiments of the present disclosure, for allowing a primary user to share services with a secondary user using, for example, bundler system 110 of FIG. 1. Method 700 may include receiving a request from a primary user, via primary user device 130, to share one of user's bundled (e.g., pre-selected or pre-purchased) services (step 702) with a secondary user. For example, after a primary user has a subscription to Netflix™ in his bundle, bundler system 110 will allow him to share the subscription with another user, either a current user of bundler system 110 or a new user to bundler system 110. In one embodiment, bundler system 110 may provide a clickable button or hyperlink to allow the primary user to lend the service (e.g., "Lend" in FIG. 10).

Figure 15:
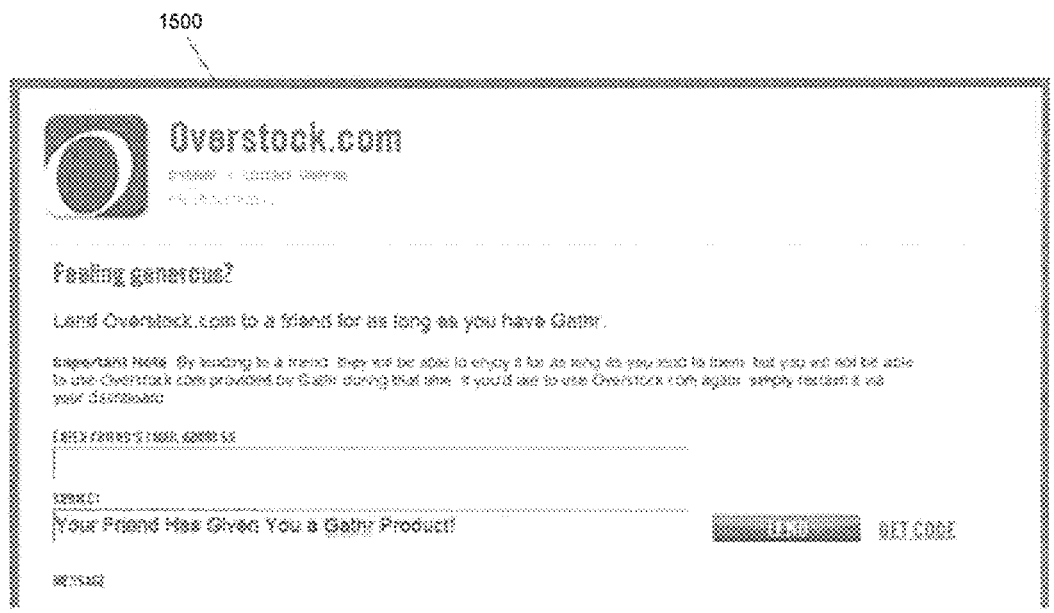
FIG. 15 depicts a screenshot of an exemplary interface for facilitating the sharing of a digital service, consistent with embodiments of the present disclosure.

In step 704, bundler system 110 may receive information from the primary user about the secondary user to facilitate the lending, such as email address or mobile phone number. In one embodiment, bundler system 110 may allow the primary user to create a personal message to send to the secondary user. FIG. 15 illustrates an exemplary interface 1500 generated by bundler system 110 for collecting information from the primary user to facilitate the lending. In step 706, bundler system 110 may generate and send a message to the secondary user on secondary user device 140. Similar to primary user device 130, secondary user device 140 may include one or more of a tablet device, mobile phone, smart-phone, computer, laptop, personal digital assistant, television, or any other device that a user may use to purchase and access services. Bundler system 110 may send the message via network 150, comprising the Internet and/or other communications network(s). The message may contain a hyperlink to access the shared service. Upon selecting the hyperlink, the secondary user may be redirected to a webpage of bundler system 110 to activate the shared service for his/her use. In another embodiment, bundler system 110 may allow the primary user to share the service with the secondary user through one of the primary user's social networks. In one implementation, bundler system 110 may allow a user to link their bundler system 110 account with other social network accounts, such as Facebook™, Twitter™, and Pinterest™. Bundler system 110 may allow the user to use one of its accounts in a social network to refer or share a bundle or a service with another accountholder of that social network.

In one embodiment, bundler system 110 may require the secondary user to set up an account with bundler system 110 in order to display a dashboard of the secondary user's services, using one or more of the steps disclosed in method 200 (FIG. 2). In another embodiment, bundler system 110 may require the secondary user to activate the shared service using one or more of the steps disclosed in exemplary method 300 (FIG. 3).

Figure 16:
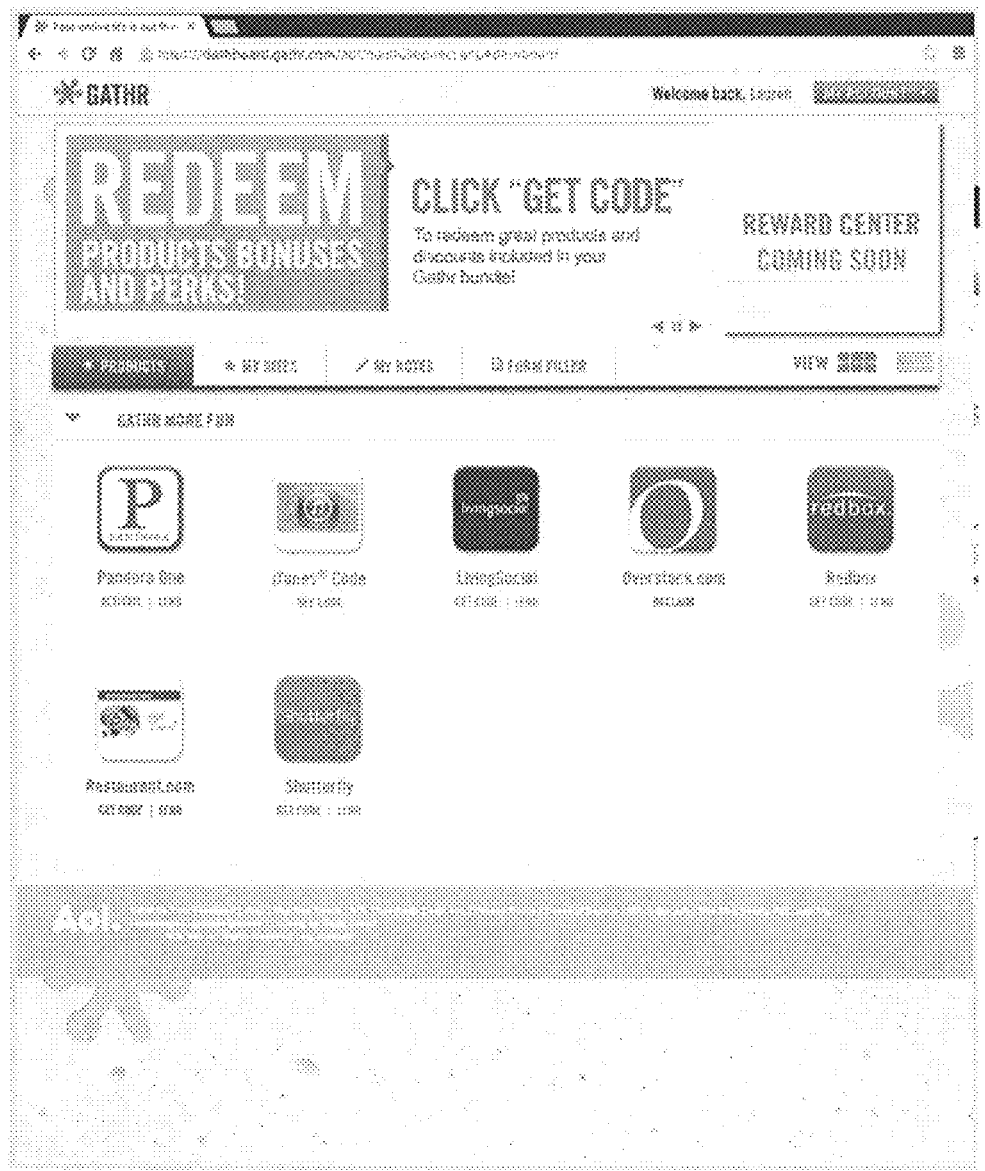
FIG. 16 depicts a screenshot of another exemplary dashboard for providing digital services in bundles, consistent with embodiments of the present disclosure.

In step 708, bundler system 110 may update the dashboard of the primary user to reflect that the service has been shared or lent to a secondary user (e.g., "Reclaim" versus "Sign In," "Activate," "See Code," or "Get Code" in FIG. 16). As a result, in one embodiment, bundler system 110 may not allow the primary user to access, use, or redeem the service while it is being shared with the secondary user. Additional embodiments are disclosed and described herein for sharing a service and reclaiming a shared service.

Figure 8:
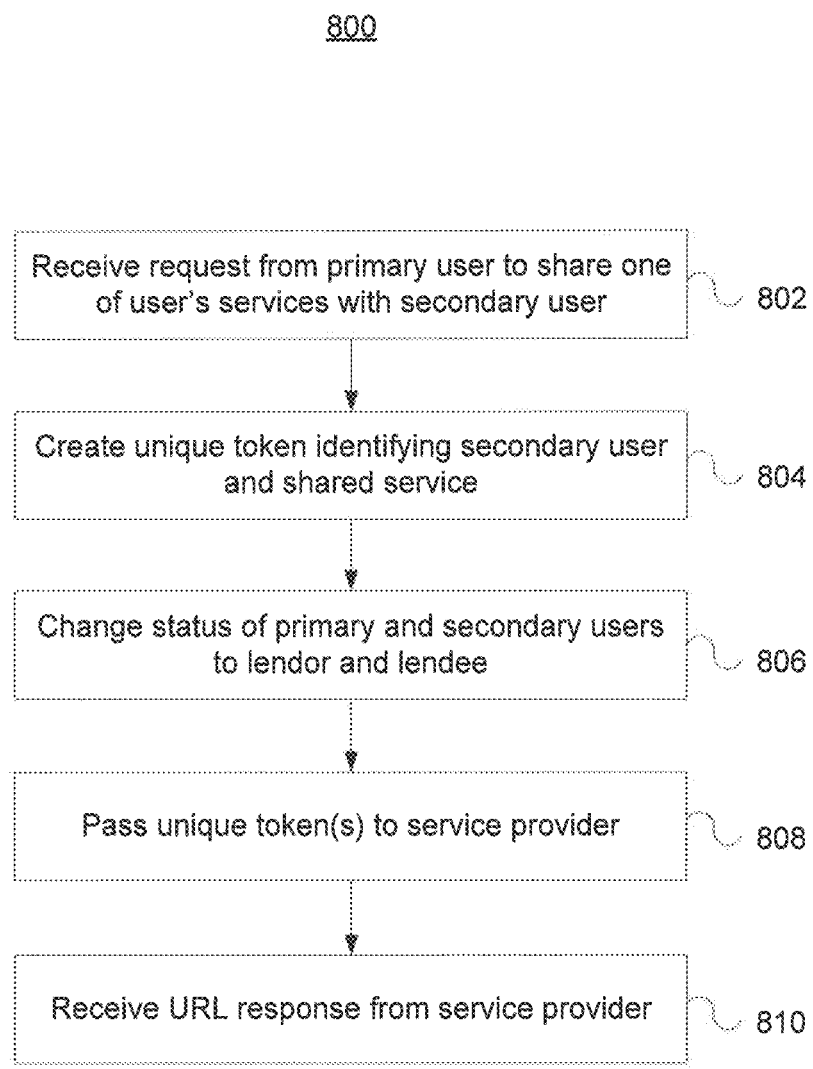
FIG. 8 depicts a flowchart of another exemplary method for sharing services in a digital bundle, consistent with embodiments of the present disclosure.

FIG. 8 discloses a flowchart of an exemplary method 800, consistent with certain embodiments of the present disclosure, for facilitating the sharing of services between a primary user and a secondary user using, for example, bundler system 110 of FIG. 1. Method 800 may include receiving a request from a primary user, via primary user device 130, to share one of user's bundled services (e.g., pre-selected or pre-purchased) with a secondary user (step 802). In step 804, bundler system 110 may create a unique token identifying the secondary user as being associated with the shared service. This token may be unique from the token generated for the primary user that is related to the specific service being shared. The token generated for the secondary user may also be associated with the primary user in order to facilitate a reclamation process, as disclosed by further embodiments herein. In one implementation, the token may comprise a multi-part token, where at least one part represents coded information associating the secondary user with the primary user, the service, and the status of the users (e.g., the primary user as lendor, the secondary user as lendee, etc.).

In step 806, bundler system 110 may change the status of the primary user and secondary user to lendor and lendee, respectively. Bundler system 110 may store these statuses. For example, the unique tokens of each of the primary and secondary users for this particular service may reflect that the service is being shared by the lendor/primary with the lendee/secondary.

In step 808, bundler system 110 may pass the unique tokens of the primary and secondary users to service provider 120 to indicate the current statuses of the primary and secondary users. The unique tokens may provide the knowledge needed by service provider 120 to allow the secondary user to now access, use, or redeem the service and to prevent the primary user from now accessing, using, or redeeming the service.

In step 810, bundler system 110 may receive a response from service provider 120 that the token(s) have been successfully received.

Figure 9:
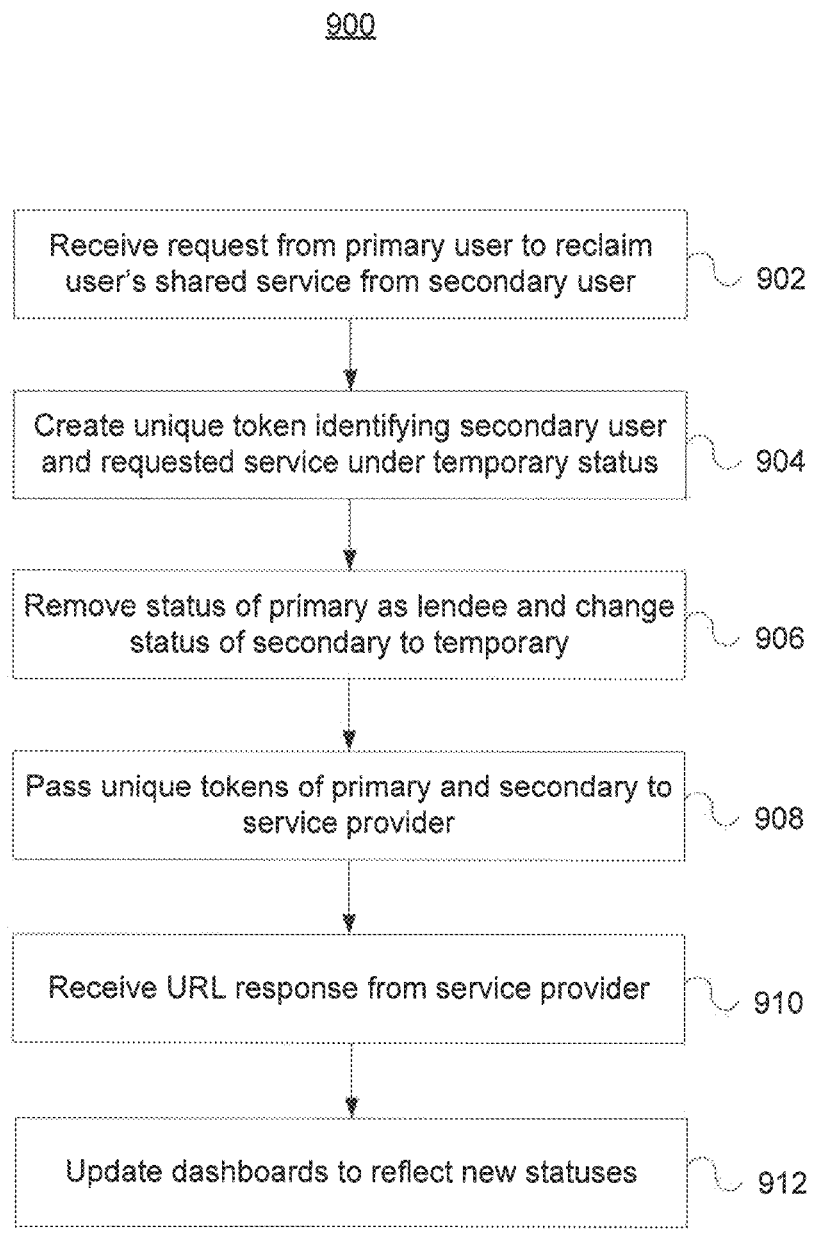
FIG. 9 depicts a flowchart of an exemplary method for reclaiming services in a digital bundle, consistent with embodiments of the present disclosure.
Figure 17:
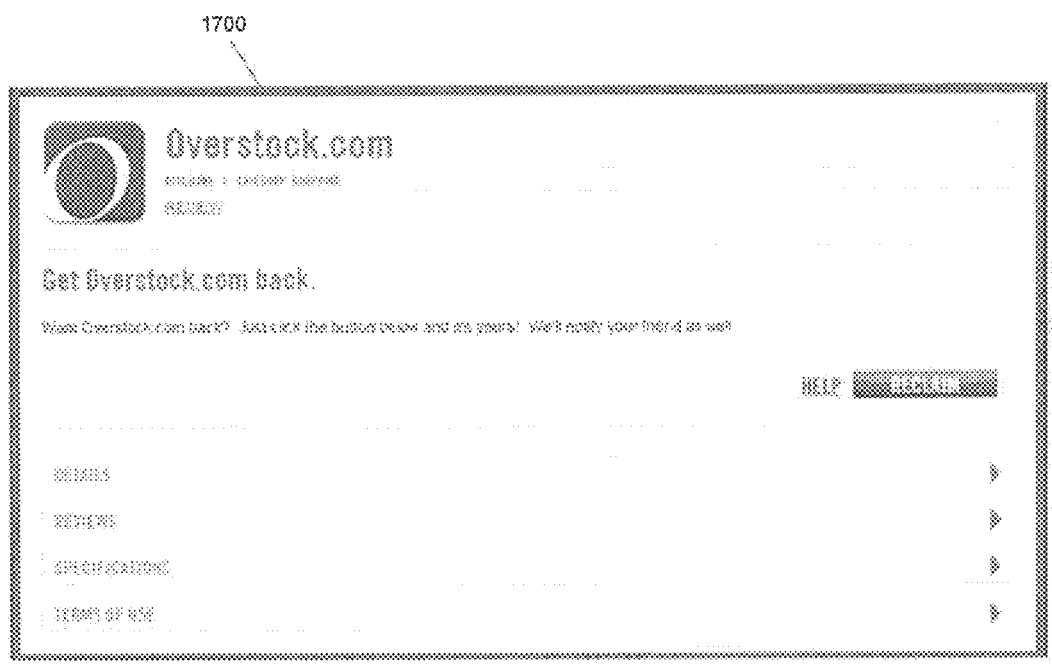
FIG. 17 depicts a screenshot of an exemplary interface for facilitating the reclaiming of a digital service, consistent with embodiments of the present disclosure.

FIG. 9 discloses a flowchart of an exemplary method 900, consistent with certain embodiments of the present disclosure, for allowing a primary user to reclaim a shared service from a secondary user using, for example, bundler system 110 of FIG. 1. Method 900 may include receiving a request from a primary user, via primary user device 130, to reclaim one of user's shared services from a secondary user (step 902). FIG. 17 illustrates an exemplary interface 1700 generated by bundler system 110 to facilitate the reclamation process. Returning to FIG. 9, in step 904, bundler system 110 may create a unique token identifying the secondary user as being associated with the now-reclaimed shared service. This token may be unique from the token originally generated for the primary user and the token generated for the secondary user when the service was shared. The new token may indicate that the secondary user's service has been reclaimed and may allow the secondary user a temporary time period in which to decide whether to keep the service by purchasing it (alone or as a bundle). For example, bundler system 110 may allow the user 24 or 48 hours to test a service and/or decide whether the purchase the service. Other time periods may be contemplated.

In step 906, bundler system 110 may change the status of the primary user and secondary user. Bundler system 110 may remove the status of the primary user as lendor and reinstate the original status. Bundler system 110 may also remove the status of the secondary as lendee and indicate a new status to reflect the temporary status provided to the secondary user by bundler system 110. Bundler system 110 may store these statuses. For example, the unique tokens of each of the primary and secondary users for this particular service may reflect that the service is no longer being shared by the primary user and is available to the secondary user for a temporary period until the secondary user purchases the service or a predetermined temporary period expires.

In step 908, bundler system 110 may pass the unique tokens of the primary and secondary users to service provider 120 to indicate the current statuses of the primary and secondary users. The unique tokens may provide the knowledge needed by service provider 120 to allow the primary user to now access, use, or redeem the service and to provide a temporary period for which the secondary user can access, use, or redeem the service. In one embodiment, the primary user's token may represent coded information associating the primary user, the service, and the status of the primary user as having reclaimed the service. The secondary user's token may further represent coded information, where at least one part of the information associates the secondary user with the service and the status of the secondary user as having temporary access to the service.

In step 910, bundler system 110 may receive a response from service provider 120 that the token(s) have been successfully received.

If the secondary user does not purchase the service before the temporary period expires, bundler system 110 may disassociate the unique token from the secondary user and the particular service. The secondary user may no longer be able to access the service.

In step 912, bundler system 110 may update the dashboard of the primary user to reflect that the service has been reclaimed. In one embodiment, bundler system 110 may indicate on the dashboard that the service can be accessed or used by the primary user. In another embodiment, bundler system 110 may offer a free trial to the secondary user after the primary user reclaims the service.

In additional embodiments, bundler system 110 may allow a user to share a digital service with one or more users. Bundler system 110 may generate tokens for each of the users for sharing the service. Bundler system 110 may also allow a user to share more than one digital service with one or more users. In one implementation, bundler system 110 may allow a user to share a combination of services or an entire bundle of services (pre-packaged or customized) with one or more users. Bundler system 110 may generate tokens for each combination of services for each user in order to share the service. Bundler system 110 may also enable the primary user to continue to use a service while sharing it with one or more secondary users. Bundler system 110 may generate new tokens or may alter existing tokens to enable primary user to continue to access and use a service during the lending period. Bundler system 110 may allow the primary user to continue using the service upon payment of a special fee. Bundler system 110 may also provide discounts or additional services to users for selecting and/or purchasing more than one bundle or more than one service in a customized bundle to incentivize or increase service and/or bundle activation.

In one embodiment, bundler system 110 may offer a free product or service to the user (e.g., a "freemium"). Based on the freemium, bundler system 110 may gather data or offer additional products or services at a charge, using freemium-based marketing. For example, bundler system 110 may offer a user a freemium that requires the user to respond to the offer. Bundler system 110 may then use the offer to collect additional consumer information in order to offer or market additional services to the user. When the user responds to the offer, bundler system 110 may collect consumer data and offer the user an opportunity to purchase additional services based on the consumer data. For example, bundler system 110 may ask the user for personal preferences, shopping history, likes/dislikes, etc. Bundler system 110 may then provide the user with the freemium. In one embodiment, the freemium may include activation of a new user account. In another embodiment, the freemium may provide access to no-cost exclusive discounts or promotional offers with affiliate service providers 120.

In another embodiment, bundler system 110 may create a meta-social graph for a user based on building connections between multiple users' social graphs to determine relationships between social networks, products, and/or users. Bundler system 110 may construct a meta-social graph regarding the bundling activities of multiple users across multiple social networks to provide valuable information on users and their relationships across social networks. In one embodiment, bundler system 110 may construct a graph across different categories or focuses of social networks, such as professional networks (e.g., LinkedIn™), photo-sharing networks (e.g., Flickr™), location-sharing networks (e.g., FourSquare™), or communication networks (e.g., Facebook™). From each social network, bundler system 110 may learn information about the user, from public information or additional information that can be collected based on user consent, such as name, educational experience, work experience, date of birth, hometown, publications, speaking engagements, handle, etc. In addition, bundler system 110 may learn information about the primary user and other users, such as the transaction rate between two people (e.g., comments, likes, favorites, mentions, etc.).

Bundler system 110 may use the data to build a meta-social graph that identifies people, in addition to digital personas, within a social network. Bundler system 110 may combine the digital personas of a user across different social networks into a single digital person. For example, a user (e.g., "Alice") may be connected to two other users, "Bob" and "Mallory," via Facebook and also connected to Bob via Flickr. Alice may know that Bob has both a Facebook and Flickr identity, and that Mallory has a Facebook identity, but may not know that Mallory has another identity in a different social network (e.g., Flickr). In turn, a fourth user, "Eve," may be connected to Mallory on both Facebook and Flickr. Bundler system 110 may determine that the Mallory "persona" that Eve is connected to Flickr represents the same user that Alice is connected to on Facebook. Bundler system 110 may combine both of the Mallory digital "personas" into a single digital "person," even if Bob and Eve are not connected.

Bundler system 110 may track activities of users via their personas across multiple social networks. As a result, bundler system 110 may determine the closest, or most engaged, people in an online environment. Using the data gathered on a user, bundler system 110 may determine a higher quality, or "trusted," recommendation of a digital service based on a user's most closely associated individuals. Bundler system 110 may group the recommendations by subject in order to prevent unwanted or undesirable influences on the recommendations, such as ensuring that a user's close connection in photography does not influence recommendations on computer security. In one embodiment, bundler system 110 may use the meta-social graph to highlight products or services a user is most likely to purchase based on the information garnered from the user, his social networks, his activities on the social networks, and his most engaged connections. Therefore, bundler system 110 may provide more targeted advertising and product promotion.

In another embodiment, bundler system 110 may determine from the meta-social graph which users are not using the services provided by bundler system 110 but who may be most likely to engage with the services in order to grow the network of users of bundler system 110. In a still further embodiment, bundler system 110 may allow a user to link their bundler system 110 account with other social network accounts, such as Facebook™, Twitter™, and Pinterest™, to refer or share a bundle or a service in a bundle with another user via one of those accounts.

In a still further embodiment, systems and methods are provided for augmenting user data with gameification. For example, bundler system 110 may incentivize and reward certain behaviors by utilizing gaming or gameification techniques. The gameification techniques may motivate a user to respond in a certain manner or take a desired action. Such techniques may include tracking and rewarding personal achievements (e.g., a user collecting something, achieving a goal, or completing a task associated with user's behavior). For example, bundler system 110 may provide points to a user for taking a desired action, such as gift cards. The gameification techniques may further refine and tailor the user experience. For example, bundler system 110 may provide the user with points for registering an account, tagging products, reviewing products, and/or subscribing to newsletters.

In other embodiments, bundler system 110 may configure a user interface to present information to the user associated with the user's activities. For example, bundler system 110 may display badges to the user indicating the user's status. For example, bundler system 110 may display a badge to the user when the user downloads a password manager plug-in. Bundler system 110 may then award points to the user when the user uses the password manager plug-in.

Using gameification techniques, bundler system 110 may influence other users' actions. In other embodiments, bundler system 101 may utilize contextual communications by displaying a signal or a message to the user (e.g., a bronze star added to the user's account).

In another embodiment, bundler system 110 may dynamically change the user's displayed status. For example, bundler system 110 may provide a hover input notification. The input notification may correspond to a signal generated by an input device via the primary user device 130 when the user hovers over data within a webpage and/or application. Persons of ordinary skill in the art will appreciate, from this disclosure, that the input notification is one of many signals that the data application may handle. The hover input notification may dynamically change the status displayed to the user. For example, the hover input notification may dynamically change the user's star level based on his accumulated points.

In one embodiment, notifications may be sent indicating purchase activity. For example, the user may be notified that they purchased $10 or $50 in redeemable gift cards.

In one embodiment, service providers 120, utilizing bundler system 110's third-party API, may have their services available for bundling. For example, service provider 120 may write to the provided API to have their service available to users (e.g., on bundler system 110's webpage or mobile application).

The system of FIG. 1 may include one or more server systems, databases, and/or computing systems configured to receive information from entities in a network, process the information, and communicate the information with other entities in the network. In certain embodiments, the system of FIG. 1 may be configured to receive data over an electronic network, such as the Internet, process/analyze the content, and provide the content to one or more applications. For example, in one embodiment, the system of FIG. 1 may operate and/or interact with one or more host servers, one or more user devices, and/or one or more repositories, for the purpose of associating all data elements and integrating them into, for example, content and advertising systems.

The various components of the system of FIG. 1 may include an assembly of hardware, software, and/or firmware, including memory, a central processing unit ("CPU"), and/or a user interface. For example, with respect to bundler system 110, memory 114 may include any type of RAM or ROM embodied in a physical storage medium, such as magnetic storage including floppy disk, hard disk, or magnetic tape; semiconductor storage such as solid state disk ("SSD") or flash memory; optical disc storage; or magneto-optical disc storage. A CPU of bundler system 110 may include one or more processors 112 for processing data according to a set of programmable instructions or software stored in memory. The functions of each processor may be provided by a single dedicated processor or by a plurality of processors. Moreover, processors may include any type or combination of input/output devices, such as a display monitor, keyboard, touch screen, and/or mouse. Furthermore, bundler system 110 may be implemented using one or more technologies such as JAVA, Apache/Tomcat, Bus Architecture (RabbitMQ), MonoDB, SOLR, GridFS, Jepetto, etc.

As further shown in FIG. 1, one or more data repositories ("databases") 116 may be provided that store data collected about each user, including the user's social networks, and/or the bundles. Database 116 may be part of bundler system 110 and/or provided separately within system environment 100. Bundler system 110 and/or system environment 100 may also include a data store for storing the software and/or instructions to be executed by one or more processors.

The system environment 100 of FIG. 1, and/or the components thereof, may also include any combination of email software, instant messaging software, document management software, webhosting software, and/or any other software or set of instructions. Such software and/or set of instructions may implement or support any number of the processes, features, and interfaces disclosed herein. In another embodiment, the software may include a set of instructions executable by a processor to provide the methods, features, and interfaces described herein.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, systems and methods consistent with the disclosed embodiments may be implemented as a combination of hardware and software or in hardware alone. Examples of hardware include computing or processing systems, including personal computers, laptops, mainframes, micro-processors and the like. Additionally, although aspects are described for being stored in memory, one skilled in the art will appreciate that these aspects can also be stored on other types of computer-readable media, such as secondary storage devices, for example, hard disks, floppy disks, or CD-ROM, or other forms of RAM or ROM.

Programmable instructions, including computer programs, based on the written description and disclosed embodiments are within the skill of an experienced developer. The various programs or program modules may be created using any of the techniques known to one skilled in the art or may be designed in connection with existing software. For example, program sections or program modules may be designed in or by means of C#, Java, C++, HTML, XML, CSS, JavaScript, or HTML with included Java applets. One or more of such software sections or modules may be integrated into a computer system or browser software or application.

In some embodiments disclosed herein, some, none, or all of the logic for the above-described techniques may be implemented as a computer program or application or as a plug-in module or subcomponent of another application. The described techniques may be varied and are not limited to the examples or descriptions provided. In some embodiments, applications may be developed for download to mobile communications and computing devices (e.g., laptops, mobile computers, tablet computers, smart phones, etc.) and made available for download by the user either directly from the device or through a website.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

It is intended, therefore, that the specification and examples be considered as exemplary only. Additional embodiments are within the purview of the present disclosure and sample claims.

What is claimed is:

1. A bundler system for allowing a primary user to share a digital service in a bundle of services with a secondary user, the bundler system comprising:
   at least one processor; and
   a memory device that stores a set of instructions which, when executed by the at least one processor, causes the bundler system to:
      receive a request from the primary user to share a first service in the bundle of services with the secondary user, the bundle of services being implemented by a plurality of different service providers;
      generate a first token that associates the secondary user with the primary user, the first token comprising coded information identifying the secondary user and the first service to be shared;
      modify a status of the primary user to restrict access to the first service while the first service is being shared with the secondary user as a lendee;
      receive a request from the secondary user to access the first service;
      send the first token, via a URL request, including the modified status of the primary user, to one of the plurality of different service providers to enable access to the first service by the secondary user; and
      render a landing page for the first service on a device of the secondary user.

2. The system in claim 1, further comprising instructions which, when executed by the at least one processor, cause the at least one processor to:
   receive a request from the primary user to reclaim the first service from the secondary user; and
   modify a status of the primary user to allow the primary user to reclaim and access the first service.

3. The system in claim 1, further comprising instructions which, when executed by the at least one processor, cause the at least one processor to:
   generate a second token that associates the secondary user with the first service, wherein the second token provides the secondary user with limited access to the first service; and
   send the second token to one of the plurality of different service providers for the first service.

4. The system in claim 1, further comprising instructions which, when executed by the at least one processor, cause the at least one processor to:
   modify a status of the secondary user to limit access to the first service by the secondary user; and
   send the modified status of the secondary user to one of the plurality of different service providers for the first service.

5. The system in claim 1, wherein the digital services in the bundle comprise at least one of a service subscription, a redeemable coupon, or an exclusive discount.

6. The system in claim 1, further comprising instructions which, when executed by the at least one processor, cause the at least one processor to:
   send an electronic notification to the secondary user that the first service is shared.

7. The system of claim 1, wherein the first token comprises multiple parts, one of the multiple parts identifying the secondary user as the lendee.

8. A computer-implemented method for sharing a digital service in a bundle of services with a secondary user, the method comprising:

receiving, by a bundler system from a device of a primary user, a request from the primary user to share a first service in the bundle of services with the secondary user, the bundle of services being implemented by a plurality of different service providers;

generating, by the bundler system, a first token that associates the secondary user with the primary user, the first token comprising coded information identifying the secondary user and the first service to be shared;

modifying a status of the primary user to restrict access to the first service while the first service is being shared with the secondary user as a lendee;

receiving, by the bundler system from a device of the secondary user, a request from the secondary user to access the first service;

sending, by the bundler system via a URL request, the first token including the modified status of the primary user, to one of the plurality of different service providers to enable access to the first service by the secondary user; and rendering a landing page for the first service on the device of the secondary user.

9. The method of claim 8, further comprising:
receiving a request from the primary user to reclaim the first service from the secondary user; and
modifying a status of the primary user to allow the primary user to reclaim and access the first service.

10. The method of claim 8, further comprising:
generating a second token that associates the secondary user with the first service, wherein the second token provides the secondary user with limited access to the first service; and
sending the second token to one of the plurality of different service providers for the first service.

11. The method of claim 8, further comprising:
modifying a status of the secondary user to limit access to the first service by the secondary user; and
sending the modified status of the secondary user to one of the plurality of different service providers for the first service.

12. The method of claim 8, wherein the digital services in the bundle comprise at least one of a service subscription, a redeemable coupon, or an exclusive discount.

13. The method of claim 8, further comprising:
sending an electronic notification to the secondary user that the first service is shared.

14. The method of claim 8, wherein the first token comprises multiple parts, one of the multiple parts identifying the secondary user as the lendee.

* * * * *